Feb. 21, 1961           C. A. BROWN           2,972,669

MATERIALS CUTTING APPARATUS AND METHOD

Filed Oct. 25, 1957

INVENTOR.
CLYDE A. BROWN
BY
ATTORNEY

United States Patent Office 2,972,669
Patented Feb. 21, 1961

2,972,669

MATERIALS CUTTING APPARATUS AND METHOD

Clyde A. Brown, 1080 Estes St., Lakewood, Colo.

Filed Oct. 25, 1957, Ser. No. 692,321

4 Claims. (Cl. 219—19)

The present invention relates to materials cutting method and apparatus and, more particularly, to a heated element cutting mechanism adapted for cutting various materials.

Previously many different types of cutting apparatus have been devised and built that satisfactorily provide means for cutting materials into either dimension shapes or in intricate designs. In general, most successful types of cutting apparatus have utilized adaptations of the basic saw and sawtooth idea. Band saws using sawteeth have previously been the most successful tool for cutting intricate patterns.

It is an object of the present invention to present a refinement in materials cutting apparatus which adapts and utilizes the basic idea of the endless or continuous type band saw in connection with the use of a heated element in order to sever various types of materials without the necessity of providing conventional sawteeth.

Another object of the present invention is to provide materials cutting apparatus capable of the production cutting of materials that is free of the characteristic noise and dust of conventional sawing apparatus.

A further object of this invention is to provide means for cutting intricate and delicate patterns from stock materials that avoids the shock forces inherent in the use of conventional sawtooth tools.

Another object of this invention is to provide apparatus for the production cutting of materials whereby more usable material is obtained due to the absence of the previously necessary wide saw kerfs.

Another object of this invention is to provide a method whereby materials may be cut utilizing an endless electrically energized cutting element.

A still further object of this invention is to provide apparatus for cutting materials which under various modes of operation provides a face protecting coating on the cut edges of the material, or which bonds, seams, smooths or cauterizes such edges, or which processes the cut edges of materials to make such edges and materials more pleasing, element resisting or tasteful.

Another object of this invention is to provide apparatus which may be used in side-by-side or ganged relation to make simultaneous cuttings of multiple pieces from a single bulk piece of material wherein the cuttings may be straight or of intricate design.

Figure 1:
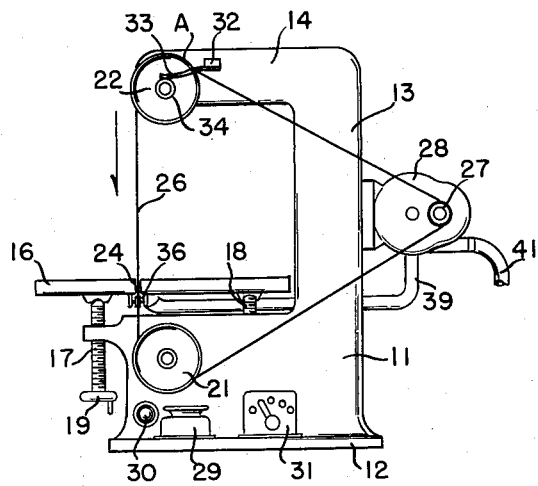
Figure 2:
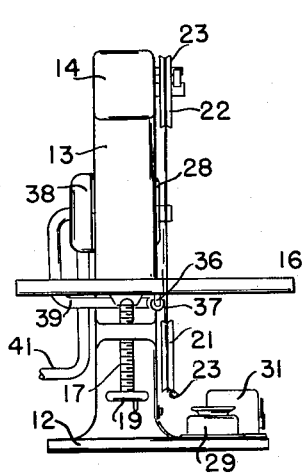
Figure 3:
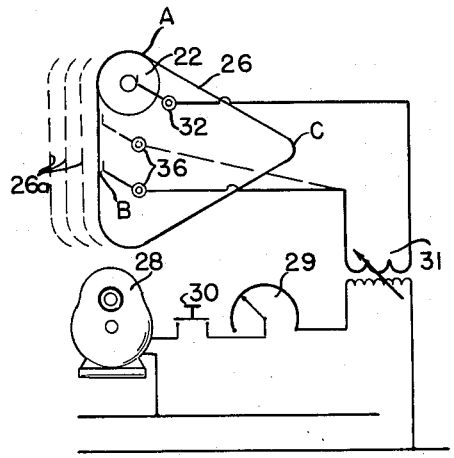

Further objects and advantages of the present invention will be apparent from the appended description and drawings, in which Fig. 1 is a side elevation of apparatus made in accordance with this invention, Fig. 2 is a front elevation of the apparatus shown in Fig. 1, and Fig. 3 is an electrical circuit diagram for such apparatus.

Briefly stated, the present invention provides materials cutting apparatus in which the cutting element is an endless wire or heated element which is wound about idler and drive pulleys to move such wire cutting element past a work surface on which materials to be cut are placed. The wire element is subjected to an electrical current through a portion of its travel of sufficient intensity to heat the element to a desired temperature which is adequate to burn and cut the material being severed. While electric current passes through the entire cutting element, the electrical contacts for transmitting the electricity to the element are cooperatively placed with respect to the work surface, so that the cutting element in moving toward the material to be cut and the work surface attains its maximum temperature at the work surface. After passing such point, the cutting element is cooled by heat transfer to the material being cut and by a reduction in current flow through such cutting element after it passes the lower contact point which is closely adjacent to such work surface. In order to adjust the heating and cutting characteristics of the cutting element, apparatus is provided for changing the positioning of the contacts introducing electricity into the cutting element in addition to apparatus for changing the speed of travel of the cutting element and for changing the current intensity or voltage impressed in the cutting element.

The detailed features of an embodiment of this invention will be more clearly understood with reference to Figs. 1, 2, and 3, in which it is shown that the apparatus provides a support frame 11, inclusive of a base 12, an upright support 13 and a cantilever arm 14, as necessary to provide a relatively large site opening between the arm 14 and a work surface 16. The work surface 16 is adjustably mounted on the base 12 by means of adjusting screws 17 and 18 which may be raised or lowered through use of hand wheels 19 either cooperatively to raise the work surface 16 to adjusted horizontal positions or separately as would be necessary to cause a tilting of the work surface 16. With this arrangement, straight or angle cuts are possible.

The base 12 provides rotating support for a lower idler pulley 21, and the cantilever arm 14 provides rotating support for an upper idler pulley 22. These pulleys 21 and 22 are arranged so that a line tangent to the drive grooves 23 of such pulleys will pass through a slot opening 24 in work surface 16. When so arranged, the wire or cutting element 26 of the present apparatus may be reeved over the idler pulleys 21 and 22 and over a drive pulley 27 on gear head motor 28, which will cause the cutting element 26 to be moved past the work surface 16 and through the slot 24 when the motor 28 is energized.

In order to accomplish the cutting function of the present apparatus, the cutting element 26, which is preferably an endless wire with a smooth surface but which may be provided with minor serrations, is made of material which may be heated by an electrical current to a high temperature without deterioration. Most materials out of which conventional heating elements for stoves and the like are made could be adapted to provide the desired wire structure. Nickel-chrome and other alloys, as well as platinum and other base metals, have been and may be found useful for this purpose.

When a proper wire has been selected and when the wire has been welded or otherwise manufactured to provide an endless or continuous wire loop, the wire is engaged over the pulleys 21, 22 and 27 for rotation along the desired path. In order to obtain the desired cutting action through use of the moving wire, an electrical current, which is preferably of low voltage but of high current value, is impressed on the wire loop to cause an electric flow through the wire. With the flow of current the wire is heated, and when the desired temperature is obtained, materials brought into contact with the wire will be burned and cut.

In order to obtain the desired temperature and the required cutting action, certain factors regulating said cutting action may be adjusted. First, the speed of movement of the wire past the work surface and the material being cut may be adjusted through use of various types of motor drive apparatus. Since for ordinary cutting of the usual plastic and wood materials a relatively slow speed is desired, the present embodiment shows the use of a gear head motor which drives the pulley 27 at reduced speed. Likewise, a rheostat 29 and a starter button 30 are provided to control motor actuation and speed. Necessarily, other types of speed control devices and circuits may be used.

Second factors controlling the cutting characteristics are the voltage and current passed through the cutting element 26. Adjustment of these factors may be obtained through use of a variable transformer or through incorporation of various types of variable resistance devices in the cutting element circuit. In the present embodiment, use of a variable transformer 31 is illustrated.

A third factor regulating the cutting characteristics of the wire 26 is the direction of movement of the wire and the positioning of the contacts which energize the cutting element. As here shown, a trolley type contact 32 is positioned adjacent the upper idler pulley 22, so that a contact finger 33 engages the hub 34 of the pulley. With this arrangement, the entire pulley 22 will be energized, and necessarily the pulley 22 and hub 34 must be insulated from its mountings on the arm 14. A second contact 36 is provided adjacent the work surface 16. As shown in the present embodiment, this contact includes the use of a contact wheel 37 to which the low voltage current is introduced. As shown in Fig. 2, the wheel 37 is preferably positioned just barely out of line with respect to a direct line between pulleys 21 and 22. With this arrangement, no current will be induced in the cutting element 26 until the material which is to be cut is pressed against the wire cutting element 26 thereby moving the wire to its alternate position, as shown in Fig. 2, against the wheel 37. When this contact is made, current will flow through the wire, and the wire will be heated as desired. With this positioning of the contacts 32 and 36, it is desirable that the wire cutting element 26 be moved downwardly toward contact with the materials being cut along the path indicated by the arrow.

Since the contacts 32 and 36 are relatively close together when compared to the total length of the endless cutting element 36, the major flow of current through the cutting element will be through the segment of cutting element disposed between the point A on idler pulley 22 (which represents the first point of tangent contact between the pulley 22 and the cutting element 26) and the contact wheel or lower trolley contact 37. Obviously, since the divisions of current flow is dependent upon relative resistances, the wire may be made hotter by moving the contacts 32 and 36 closer together. This function may be accomplished by movement of the adjusting screws 17 and 18 to raise the work surface 16 and contact 36 affixed thereto.

Through cooperative adjustment of these factors and through proper selection of the type and size of wire, desirable cutting characteristics and cutting speeds for many different types of materials may be obtained. Apparatus as described may be used to cut thin sections of wood, either plain or laminated, or with proper design may be used to cut dimension materials and large timbers. Actually it would be possible through use of this type system to cut slabs, planks and dimension materials from logs. Likewise, plastics, inclusive of solid materials and fabrics, as well as sponge products of plastic or rubber, and many other types of natural and synthetic materials, as well as metals, may be cut and patterned through use of this type apparatus.

A major advantage inherent in the use of a cutting wire is the fact that the shock abrasions characteristic of the use of sawtooth devices is avoided. Likewise, since the wire may be of small diameter, the waste of wide saw kerfs is avoided. Further, the cutting action of the wire cutting element 26 is non-directional, and accordingly when intricate designs are being cut, it is not necessary to rotate the work piece to cut along the crooked line of a pattern.

It is contemplated that the simpler devices made in accordance with this invention will be for the cutting of wood and similar products. For such application, the apparatus provides additional advantages, inasmuch as there is no sawdust developed coincident with the use of the apparatus. However, since the wood is burned in cutting, smoke will be developed. In order to remove the smoke from the point of operation, a fan section 38 is provided on the motor 28 so that a suction hose 39 may be interconnected to the fan section to draw smoke away from the cutting operation. A blower hose 41 may likewise be connected to the fan 38 so that the smoke drawn off may be delivered through the blower hose 41 to a point of discharge outside the building in which the apparatus is being used. Because the work surface 16 is movable and further because the motor 28 may be made movable on its mounts along upright support 13 in order to adjust the tension in wire cutting element 26, the hoses 39 and 41 should be of flexible material.

As represented in Fig. 3, a plurality of wire cutting elements 26a may be positioned in side-by-side relation to provide apparatus for cutting multiple segments simultaneously. It is conceived that a plurality of such cutting wires could be used in side-by-side relation to cut planks or slabs from large dimension materials or even from rough logs. Likewise, since the cutting action of the wires is non-directional, a plurality of intricately shaped pieces all of the same size and configuration could be cut from a single bulk piece of material simultaneously. This operation could proceed automatically through incorporation of proper feed and control devices.

It has been found that the heated element in its cutting operation leaves a charred face on wood and similar products. This charred face can be quite decorative, and accordingly the apparatus may be beneficially used for decorative purposes. Further, since the presence of the charred surface tends to close the pores of the material, the use of such apparatus to protect the surface is suggested. The heating or burning properties of the apparatus will be found useful in bonding, cauterizing, seaming, and smoothing the edges of various materials and products.

While described in connection with the cutting and treatment of materials which are ordinarily considered to be structural or decorative materials, it has been found that the apparatus is adaptable to the processing and treatment of food products. Use of apparatus made in accordance with this invention in which a plurality of cutting elements are positioned in side-by-side ganged relation to simultaneously cut, warm and toast bread is contemplated.

In all such processes and all such beneficial uses, it will not be necessary to depart materially from the basic method of the present invention wherein an endless wire or other type cutting element is subjected to supplemental heating prior to contact with the material to be cut. In the present embodiment an electric current is imposed on the cutting element at such positions that the element itself is effectively divided into two separate parallel electrical circuits, one circuit being represented by the portion or segments of the cutting element disposed between the points of energization A and B (as represented by the separate contacts 32 and 36) and the other of the parallel circuits being between the points B, C and A. Here it will be seen that the length of cutting element A, B is much less than that of B, C, A.

Consequently, the resistance is less and the element heating current is greater in the segment A, B. Since heating of the cutting element is a function of current flow characteristics and the time that any portion is subjected to such current, the cutting element moves progressively along the path A, B, C, A so the heated cutting element segment A, B, attains its maximum temperature adjacent point B or the lower contact. When this point of maximum heating is adjacent the work surface, greater efficiency results. Other methods of obtaining the required supplemental heating are possible without departure from the present method and invention.

Actually, it is apparent that many different modifications of the invention are possible. All such modifications which use the significant features of this invention or the methods disclosed herein and which come within the scope of the hereunto appended claims are deemed to be a part of this invention.

What is claimed is:

1. Materials cutting apparatus comprising a frame, a work surface disposed on said frame and movable with respect thereto, guide means on said frame, an endless cutting element adapted to move along a closed path defined by said guide means and past said work surface, a source of electrical power inclusive of an electrical circuit, contacts connected in said electrical circuit and positioned along said cutting element for energizing and heating said element with one of said contacts being movable with said work surface, and drive means for moving said cutting element along its closed path and past said contacts unidirectionally from one to the other.

2. Materials cutting apparatus comprising a frame, guide means on said frame, an endless cutting element adapted to move along a closed path defined by said guide means, a source of electrical power, contacts connected to said source of electrical power and positioned along said cutting element for energizing and heating said element, with one of said contacts being out of the normal track of said cutting element when said cutting element is moving along its closed path, whereby when materials which are to be cut are pressed against the cutting element, the said cutting element will be moved against said contact to energize said cutting element, and drive means for moving said cutting element.

3. Materials cutting apparatus comprising a frame, a work surface disposed on said frame, guide means on said frame, an endless cutting element adapted to move along a closed path defined by said guide means and past said work surface, a source of electrical power inclusive of an electrical circuit, contacts connected in said electrical circuit and positioned along said cutting element to divide said cutting element into parallel circuits having uneven resistance properties with at least one of said contacts being movable to change the resistance and circuit characteristics of said cutting element, power regulating means in said circuit for further and selectively changing the properties and characteristics of the electric flow in said circuit, drive means for moving said cutting element along its closed path and past said work surface, and a speed control unit for controlling the speed of movement of said drive means and cutting element.

4. Materials cutting apparatus for simultaneously cutting multiple patterned figures from sheet materials comprising a frame, a work surface disposed on said frame, guide means on said frame, a plurality of endless wire cutting elements adapted to move along a closed path into and out of contact with said guide means and passing transversely through the plane of said materials, a source of electrical power for energizing and heating said cutting elements uniformly about the external surfaces thereof to provide multi-directional cutting capability, and drive means for moving said cutting elements along their respective closed paths and into contact with said material, said work surface providing support for the multi-directional movement of said materials whereby multiple geometrically-related patterns will be cut from said materials by each of said cutting elements as the material is moved to cut one such pattern.

References Cited in the file of this patent

UNITED STATES PATENTS

| | | |
|---|---|---|
| 127,270 | Robinson | May 28, 1872 |
| 1,050,768 | Gantke | Jan. 14, 1913 |
| 2,004,580 | Meyer | June 11, 1935 |
| 2,284,648 | Foreman | June 2, 1942 |
| 2,430,920 | Dodge | Nov. 18, 1947 |
| 2,526,650 | Gaibel | Oct. 24, 1950 |
| 2,556,008 | Spalding | June 5, 1951 |
| 2,579,955 | Orescan | Dec. 25, 1951 |
| 2,655,960 | Murray | Oct. 20, 1953 |
| 2,779,851 | Vogt | Jan. 29, 1957 |
| 2,797,290 | Ebling | June 25, 1957 |